United States Patent
Klein (10) Patent No.: US 10,089,242 B2
(45) Date of Patent: Oct. 2, 2018

(54) MEMORY MANAGEMENT FOR A HIERARCHICAL MEMORY SYSTEM

(71) Applicant: Micron Technology, Inc., Boise, ID (US)

(72) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/371,044

(22) Filed: Dec. 6, 2016

(65) Prior Publication Data

US 2017/0083452 A1    Mar. 23, 2017

Related U.S. Application Data (62) Division of application No. 13/552,491, filed on Jul. 18, 2012, now Pat. No. 9,524,248.

(51) Int. Cl.
| | |
|---|---|
| *G06F 12/00* | (2006.01) |
| *G06F 12/1009* | (2016.01) |
| *G06F 12/1027* | (2016.01) |
| *G06F 12/123* | (2016.01) |
| *G06F 3/06* | (2006.01) |

(52) U.S. Cl.
CPC ........ *G06F 12/1009* (2013.01); *G06F 3/0604* (2013.01); *G06F 3/0647* (2013.01); *G06F 3/0653* (2013.01); *G06F 3/0685* (2013.01); *G06F 12/1027* (2013.01); *G06F 12/123* (2013.01); *G06F 2212/1008* (2013.01); *G06F 2212/657* (2013.01)

(58) Field of Classification Search
CPC ...... G06F 3/0647; G06F 3/0649; G06F 3/068; G06F 3/06; G06F 3/0685; G06F 2212/205; G06F 11/3034; G06F 3/0622; G06F 3/0604; G06F 3/0637; G06F 3/0673

See application file for complete search history.

(56) References Cited

U.S. PATENT DOCUMENTS

| | | | |
|---|---|---|---|
| 3,849,762 A | 11/1974 | Fujimoto et al. | |
| 3,921,136 A | 11/1975 | Bar-Lev | |
| 4,011,547 A | 3/1977 | Kimmel | |

(Continued)

FOREIGN PATENT DOCUMENTS

| | | |
|---|---|---|
| EP | 0476159 A1 | 3/1992 |
| EP | 0943995 A2 | 9/1999 |

(Continued)

OTHER PUBLICATIONS

Chinese Office Action for CN Application No. 201380038489.5 dated Jan. 10, 2017; 8 Pages.

(Continued)

*Primary Examiner* — Reginald Bragdon
*Assistant Examiner* — Hannah A Faye-Joyner
(74) *Attorney, Agent, or Firm* — Fletcher Yoder, P.C.

(57) ABSTRACT

Disclosed are systems and methods for managing memory. A memory management system may include a table having multiple virtual memory addresses. Each virtual memory address may correspond to a physical memory address and data that identifies a type of memory device corresponding to the physical memory address. The physical memory device can be used to access the memory device when a table hit occurs.

22 Claims, 4 Drawing Sheets

(56) References Cited

U.S. PATENT DOCUMENTS

| | | |
|---|---|---|
| 4,014,000 A | 3/1977 | Uno et al. |
| 4,123,695 A | 10/1978 | Hale et al. |
| 4,153,897 A | 5/1979 | Yasuda et al. |
| 4,204,193 A | 5/1980 | Schroeder |
| 4,414,685 A | 11/1983 | Sternberg |
| 4,748,674 A | 5/1988 | Freeman |
| 5,014,327 A | 5/1991 | Potter et al. |
| 5,028,821 A | 7/1991 | Kaplinsky |
| 5,216,748 A | 6/1993 | Quenot et al. |
| 5,257,361 A | 10/1993 | Doi et al. |
| 5,287,523 A | 2/1994 | Allison et al. |
| 5,291,482 A | 3/1994 | McHarg et al. |
| 5,300,830 A | 4/1994 | Hawes |
| 5,331,227 A | 7/1994 | Hawes |
| 5,357,512 A | 10/1994 | Khaira et al. |
| 5,371,878 A | 12/1994 | Coker |
| 5,377,129 A | 12/1994 | Molvig et al. |
| 5,459,798 A | 10/1995 | Bailey et al. |
| 5,615,237 A | 3/1997 | Chang et al. |
| 5,659,551 A | 8/1997 | Huott et al. |
| 5,723,984 A | 3/1998 | Sharpe-Geisler |
| 5,754,878 A | 5/1998 | Asghar et al. |
| 5,790,531 A | 8/1998 | Ellebracht et al. |
| 5,881,312 A | 3/1999 | Dulong |
| 5,896,548 A | 4/1999 | Ofek |
| 5,956,741 A | 9/1999 | Jones |
| 6,011,407 A | 1/2000 | New |
| 6,016,361 A | 1/2000 | Hongu et al. |
| 6,034,963 A | 3/2000 | Minami et al. |
| 6,041,405 A | 3/2000 | Green |
| 6,052,766 A | 4/2000 | Betker et al. |
| 6,058,469 A | 5/2000 | Baxter |
| 6,151,644 A | 11/2000 | Wu |
| 6,240,003 B1 | 5/2001 | McElroy |
| 6,279,128 B1 | 8/2001 | Arnold et al. |
| 6,317,427 B1 | 11/2001 | Augusta et al. |
| 6,362,868 B1 | 3/2002 | Silverbrook |
| 6,400,996 B1 | 6/2002 | Hoffberg et al. |
| 6,412,057 B1 * | 6/2002 | Sasahara ............. G06F 12/10 711/202 |
| 6,606,699 B2 | 8/2003 | Pechanek et al. |
| 6,614,703 B2 | 9/2003 | Pitts et al. |
| 6,625,740 B1 | 9/2003 | Datar et al. |
| 6,633,443 B1 | 10/2003 | Watanabe et al. |
| 6,636,483 B1 | 10/2003 | Pannell |
| 6,640,262 B1 | 10/2003 | Uppunda et al. |
| 6,697,979 B1 | 2/2004 | Vorbach et al. |
| 6,700,404 B1 | 3/2004 | Feng et al. |
| 6,880,087 B1 | 4/2005 | Carter |
| 6,906,938 B2 | 6/2005 | Kaginele |
| 6,944,710 B2 | 9/2005 | Regev et al. |
| 6,977,897 B1 | 12/2005 | Nelson et al. |
| 7,010,639 B2 | 3/2006 | Larson et al. |
| 7,089,352 B2 | 8/2006 | Regev et al. |
| 7,146,643 B2 | 12/2006 | Dapp et al. |
| 7,176,717 B2 | 2/2007 | Sunkavalli et al. |
| 7,276,934 B1 | 10/2007 | Young |
| 7,305,047 B1 | 12/2007 | Turner |
| 7,358,761 B1 | 4/2008 | Sunkavalli et al. |
| 7,366,352 B2 | 4/2008 | Kravec et al. |
| 7,392,229 B2 | 6/2008 | Harris et al. |
| 7,428,722 B2 | 9/2008 | Sunkavalli et al. |
| 7,487,131 B2 | 2/2009 | Harris et al. |
| 7,487,542 B2 | 2/2009 | Boulanger et al. |
| 7,499,464 B2 | 3/2009 | Ayrapetian et al. |
| 7,725,510 B2 | 5/2010 | Alicherry et al. |
| 7,774,286 B1 | 8/2010 | Harris |
| 7,804,719 B1 | 9/2010 | Chirania et al. |
| 7,890,923 B2 | 2/2011 | Elaasar |
| 7,899,052 B1 | 3/2011 | Hao et al. |
| 7,917,684 B2 | 3/2011 | Noyes et al. |
| 7,970,964 B2 | 6/2011 | Noyes |
| 8,015,530 B1 | 9/2011 | Sinclair et al. |
| 8,020,131 B1 | 9/2011 | Van Mau et al. |
| 8,065,249 B1 | 11/2011 | Harris et al. |
| 8,140,780 B2 | 3/2012 | Noyes |
| 8,146,040 B1 | 3/2012 | Janneck et al. |
| 8,159,900 B2 | 4/2012 | Moore et al. |
| 8,209,521 B2 | 6/2012 | Noyes et al. |
| 8,239,660 B2 | 8/2012 | Cervini |
| 8,281,395 B2 | 10/2012 | Pawlowski |
| 8,294,490 B1 | 10/2012 | Kaviani |
| 8,402,188 B2 | 3/2013 | Noyes et al. |
| 8,536,896 B1 | 9/2013 | Trimberger |
| 8,593,175 B2 | 11/2013 | Noyes et al. |
| 8,648,621 B2 | 2/2014 | Noyes et al. |
| 8,680,888 B2 | 3/2014 | Brown et al. |
| 8,725,961 B2 | 5/2014 | Noyes |
| 8,782,624 B2 | 7/2014 | Brown et al. |
| 8,938,590 B2 | 1/2015 | Noyes et al. |
| 9,058,465 B2 | 6/2015 | Noyes et al. |
| 9,063,532 B2 | 6/2015 | Brown |
| 9,075,428 B2 | 7/2015 | Brown |
| 9,118,327 B2 | 8/2015 | Noyes et al. |
| 9,235,798 B2 | 1/2016 | Brown et al. |
| 2002/0186044 A1 | 12/2002 | Agrawal et al. |
| 2003/0107996 A1 | 6/2003 | Black et al. |
| 2003/0142698 A1 | 7/2003 | Parhi |
| 2003/0163615 A1 | 8/2003 | Yu |
| 2003/0226002 A1 | 12/2003 | Boutaud et al. |
| 2004/0100980 A1 | 5/2004 | Jacobs et al. |
| 2004/0125807 A1 | 7/2004 | Liu et al. |
| 2004/0151211 A1 | 8/2004 | Snider |
| 2004/0184662 A1 | 9/2004 | Kravec et al. |
| 2005/0154916 A1 | 7/2005 | Boulanger et al. |
| 2005/0160250 A1 | 7/2005 | Yoshimi |
| 2005/0251638 A1 | 11/2005 | Boutaud et al. |
| 2006/0158219 A1 | 7/2006 | Sunkavalli et al. |
| 2006/0195496 A1 | 8/2006 | Vadi et al. |
| 2006/0206875 A1 | 9/2006 | Ullmann et al. |
| 2006/0257043 A1 | 11/2006 | Chiu |
| 2006/0274001 A1 | 12/2006 | Guttag et al. |
| 2006/0288070 A1 | 12/2006 | Vadi et al. |
| 2007/0005869 A1 | 1/2007 | Balraj et al. |
| 2007/0075878 A1 | 4/2007 | Furodet et al. |
| 2007/0127482 A1 | 6/2007 | Harris et al. |
| 2007/0150623 A1 | 6/2007 | Kravec et al. |
| 2007/0282833 A1 | 12/2007 | McMillen |
| 2007/0283108 A1 | 12/2007 | Isherwood et al. |
| 2008/0126690 A1 | 5/2008 | Rajan et al. |
| 2008/0129334 A1 | 6/2008 | Sunkavalli et al. |
| 2008/0133874 A1 | 6/2008 | Capek et al. |
| 2008/0140661 A1 | 6/2008 | Pandya |
| 2008/0178031 A1 | 7/2008 | Kim |
| 2008/0256347 A1 | 10/2008 | Eickemeyer et al. |
| 2008/0320053 A1 | 12/2008 | Iijima et al. |
| 2009/0198952 A1 | 8/2009 | Khmelnitsky et al. |
| 2009/0204734 A1 | 8/2009 | Strait et al. |
| 2010/0005269 A1 | 1/2010 | Davies et al. |
| 2010/0100691 A1 | 4/2010 | Noyes et al. |
| 2010/0100714 A1 | 4/2010 | Noyes et al. |
| 2010/0115173 A1 | 5/2010 | Noyes |
| 2010/0115347 A1 | 5/2010 | Noyes |
| 2010/0118425 A1 | 5/2010 | Rafaelof |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0145182 A1 | 6/2010 | Schmidt et al. |
| 2010/0175130 A1 | 6/2010 | Pawlowski |
| 2010/0174887 A1 | 7/2010 | Pawlowski |
| 2010/0174929 A1 | 7/2010 | Pawlowski |
| 2010/0185647 A1 | 7/2010 | Noyes |
| 2010/0325352 A1 | 12/2010 | Schuette et al. |
| 2010/0332809 A1 | 12/2010 | Noyes et al. |
| 2011/0004578 A1 | 1/2011 | Momma et al. |
| 2011/0145182 A1 | 6/2011 | Dlugosch et al. |
| 2011/0145271 A1 | 6/2011 | Noyes et al. |
| 2011/0145544 A1 | 6/2011 | Noyes et al. |
| 2011/0161620 A1 | 6/2011 | Kaminski et al. |
| 2011/0208900 A1 | 8/2011 | Schuette et al. |
| 2011/0258360 A1 | 10/2011 | Noyes |
| 2011/0289257 A1 | 11/2011 | Hathaway et al. |
| 2011/0307233 A1 | 12/2011 | Tseng et al. |

(56) References Cited

U.S. PATENT DOCUMENTS

| | | |
|---|---|---|
| 2011/0307433 A1 | 12/2011 | Dlugosch |
| 2011/0307503 A1 | 12/2011 | Dlugosch |
| 2011/0320759 A1 | 12/2011 | Craddock et al. |
| 2012/0002330 A1 | 1/2012 | Tremaine et al. |
| 2012/0005454 A1 | 1/2012 | Waugh |
| 2012/0179854 A1 | 7/2012 | Noyes |
| 2012/0192163 A1 | 7/2012 | Glendenning et al. |
| 2012/0192164 A1 | 7/2012 | Xu et al. |
| 2012/0192165 A1 | 7/2012 | Xu et al. |
| 2012/0192166 A1 | 7/2012 | Xu et al. |
| 2013/0154685 A1 | 6/2013 | Noyes |
| 2013/0156043 A1 | 6/2013 | Brown et al. |
| 2013/0159239 A1 | 6/2013 | Brown et al. |
| 2013/0159670 A1 | 6/2013 | Noyes |
| 2013/0159671 A1 | 6/2013 | Brown et al. |
| 2013/0275709 A1 | 10/2013 | Gajapathy |
| 2014/0025614 A1 | 1/2014 | Noyes et al. |
| 2014/0025923 A1 | 1/2014 | Klein |
| 2014/0067736 A1 | 3/2014 | Noyes |
| 2014/0204956 A1 | 7/2014 | Brown et al. |
| 2014/0225889 A1 | 8/2014 | Kim et al. |
| 2014/0279776 A1 | 9/2014 | Brown et al. |
| 2014/0325494 A1 | 10/2014 | Brown et al. |

FOREIGN PATENT DOCUMENTS

| | | |
|---|---|---|
| JP | S63244152 A | 10/1988 |
| JP | H05233452 A | 9/1993 |
| JP | 08087462 A | 4/1996 |
| JP | 10069459 A | 3/1998 |
| JP | 10111862 A | 4/1998 |
| JP | 2000231549 A | 8/2000 |
| JP | 2000231549 A | 8/2000 |
| JP | 2000347708 A | 12/2000 |
| JP | 2004157686 A | 6/2004 |
| JP | 2007304747 A | 11/2007 |
| JP | 2008090554 A | 4/2008 |
| KR | 1020080097573 A | 11/2008 |
| KR | 1020080097573 A | 11/2008 |
| TW | 201107974 A | 3/2011 |
| WO | WO0065425 A1 | 11/2000 |
| WO | WO0138978 A1 | 5/2001 |
| WO | WO03039001 A1 | 5/2003 |
| WO | WO2005036750 A1 | 4/2005 |
| WO | 2011114120 A1 | 9/2011 |
| WO | WO2011114120 A1 | 9/2011 |

OTHER PUBLICATIONS

Japanese Office Action for JP Application No. 2015-523126 dated Apr. 4, 2017; 8 Pages.
Beesley, K. R.; Arabic Morphology Using Only Finite-State Operations; Xerox Research Centre Europe; pp. 50-57; 1998.
Bird, S. et al.; One-Level Phonology: Autosegmental Representations and Rules as Finite Automata; Association for Computational Linguistics; University of Edinburgh; vol. 20; No. 1; pp. 55-90; 1994.
Bispo, J. et al.; Regular Expression Matching for Reconfigurable Packet Inspection; IEEE International Conference on Field Programmable Technology; 2006.
Bispo, J. et al.; Synthesis of Regular Expressions Targeting FPGAs: Current Status and Open Issues; IST/INESC-ID, Libson, Portugal; pp. 1-12; 2007.
Brodie, B. et al.; A scalable Architecture for High-Throughput Regular-Expression Pattern Matching; Exegy Inc.; pp. 1-12; 2006.
Clark, C.; Design of Efficient FPGA Circuits for Matching Complex Patterns in Network Intrusion Detection Systems (Master of Science Thesis); Georgia Institute of Technology; pp. 1-56; Dec. 2003.
Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the 12$^{th}$ Annual IEEE symposium on Field-Programmable Custom Computing Machines (FCCM'04); Georgia Institute of Technology; pp. 1-9; 2004.
Clark, C. et al.; A Unified Model of Pattern-Matching Circuit Architectures; Tech Report GIT-CERCS-05-20; Georgia Institute of Technology; pp. 1-17; 2005.
Fide, S.; String Processing in Hardware; Scalable Parallel and Distributed Systems Lab; Proceedings of the 12$^{th}$ Annual IEEE symposium on Field-Programmable Custom Computing Machines (FCCM'04); School of Electrical and Computer Engineering; Georgia Institute of Technology; pp. 1-9; 2004.
Fisk, M. et al.; Applying Fast String Matching to Intrusion Detection; Los Alamos National Laboratory; University of California San Diego; pp. 1-21; 2002.
Korenek, J.; Traffic Seamier-Hardware Accelerated Intrusion Detection System; http://www.liberouter.org/ ; 2006.
Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.
Lipovski, G.; Dynamic Systolic Associative Memory Chip; IEEE; Department of Electrical and Computer Engineering; University of Texas at Austin; pp. 481-492; 1990.
Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.
Schultz, K. et al.; Fully Parallel Integrated CAM/RAM Using Preclassification to Enable Large Capacities; IEEE Journal on Solid-State Circuits; vol. 31; No. 5; pp. 689-699; May 1996.
Shafai, F. et al.; Fully Parallel 30-MHz, 2.5-Mb CAM; IEEE Journal of Solid-State Circuits, vol. 33; No. 11; pp. 1690-1696; Nov. 1998.
Sidhu, R. et al.; Fast Regular Expression Pattern Matching using FPGAs; Department of EE-Systems; University of Southern California; pp. 1-12; 2001.
Wada, T.; Multiobject Behavior Recognition Event Driven Selective Attention Method; IEEE; pp. 1-16; 2000.
Yu, F.; High Speed Deep Packet Inspection with Hardware Support; Electrical Engineering and Computer Sciences; University of California at Berkeley; pp. 1-217; Nov. 22, 2006.
Freescale and Kaspersky® Accelerated Antivirus Solution Platform for OEM Vendors; Freescale Semiconductors Document; pp. 1-16; 2007.
PCT/US2009/067534 International Search Report and Written Opinion dated Apr. 26, 2010.
PCT/US2009/061649 International Search Report dated Feb. 15, 2010.
Taiwan Application No. 098144804 Office Action dated Nov. 4, 2013.
PCT/US2012/067992 International Search Report dated Mar. 28, 2013.
PCT/US2012/068011 International Search Report dated Apr. 15, 2013.
PCT/US2012/067999 International Search Report dated May 14, 2013.
PCT/US2012/067995 International Search Report dated May 17, 2013.
PCT/US2012/067988 International Search Report (Partial) dated Jun. 24, 2014.
PCT/US2013/049744 International Search Report and Written Opinion dated Oct. 22, 2013.
PCT/US2013/049748 International Search Report and Written Opinion dated Oct. 22, 2013.
PCT/US2013/049755 International Search Report and Written Opinion dated Oct. 24, 2013.
PCT/US2013/049753 International Search Report and Written Opinion dated Nov. 7, 2013.
PCT/US2013/055434 International Search Report and Written Opinion dated Nov. 29, 2013.
PCT/US2013/055438 International Search Report and Written Opinion dated Nov. 29, 2013.
PCT/US2013/055436 International Search Report and Written Opinion dated Dec. 9, 2013.

(56) References Cited

OTHER PUBLICATIONS

PCT/US2014/023589 International Search Report and Written Opinion dated Jul. 24, 2014.
Soewito et al., "Self-Addressable Memory-Based FSM: A scalable Intrusion Detection Engine", IEEE Network, pp. 14-21; Feb. 2009.
Hurson A. R.; A VLSI Design for the Parallel Finite State Automation and Its Performance Evaluation as a Hardware Scanner; International Journal of Computer and Information Sciences, vol. 13, No. 6; 1984.
Carpenter et al., "A Massively Parallel Architecture for a Self-Organizing Neural Pattern Recognition Machine", Academic Press, Inc.; 1987.
Cong et al., "Application-Specific Instruction Generation for Configurable Processor Architectures", Computer Science Department, University of California, ACM; 2004.
Glette et al., "An Online EHW Pattern Recognition System Applied to Face Image Recognition", University of Oslo, Norway; 2007.
Kawai et al., "An Adaptive Pattern Recognition Hardware with On-chip Shift Register-based Partial Reconfiguration", IEEE; 2008.
Kutrib et al., "Massively Parallel Pattern Recognition with Link Features", IFIG Research Report 0003; 2000.
Marculescu et al., Power Management of Multi-Core Systems: Challenges, Approaches, and Recent Developments Tutorial at ASPLOS, London, UK [online]; Mar. 4, 2012.
Vitanen et al.; Image Pattern Recognition Using Configurable Logic Cell Array; New Advances in Computer Graphics; pp. 355-368; 1989.
Yasunaga et al., "Kernel-based Pattern Recognition Hardware: Its Design Methodology Using Evolved Truth Tables", IEEE, 2000.
U.S. Appl. No. 60/652,738, filed Feb. 12, 2005, Harris.
U.S. Appl. No. 61/788,364, filed Mar. 15, 2013, Brown et al.
International Search Report and Written Opinion dated Nov. 7, 2013 for PCT/US2013/049753 filed Jul. 9, 2013.
TW Office Action dated May 22, 2015.
European Office Action for EP Application No. 13819365.1 dated Jan. 26, 2018; 8 Pages.

* cited by examiner

MEMORY MANAGEMENT FOR A HIERARCHICAL MEMORY SYSTEM

CROSS-REFERENCE TO RELATED APPLICATIONS

The present application is a Divisional of U.S. application Ser. No. 13/552,491, entitled "MEMORY MANAGEMENT FOR A HIERARCHICAL MEMORY SYSTEM," and filed Jul. 18, 2012, now U.S. Pat. No. 9,524,248 which will issue on Dec. 20, 2016, the entirety of which is incorporated by reference herein for all purposes.

BACKGROUND

Field of Invention

Embodiments of the present invention relate generally to memory management. More specifically, embodiments of the present invention may provide one or more techniques for memory management in a hierarchical memory system.

Description of Related Art

Computer systems are generally employed in numerous configurations to provide a variety of computing functions. Processing speeds, system flexibility, power consumption, and size constraints are typically considered by design engineers tasked with developing computer systems and system components. Computer systems generally include a plurality of memory devices (e.g., a dual in-line memory module (DIMM) may contain 8, 16, or more memory devices, a stacked NAND flash package may contain 2, 4, or 8 NAND die) and a plurality of memory types (i.e., memory devices that may have different performance and/or power characteristics) which may be used to store data (e.g., programs and user data) and which may be accessible to other system components such as processors or peripheral devices. Such memory devices may include volatile and non-volatile memory devices.

Typically, the memory address space of a computing system is managed by a memory management system. In certain computing systems, the memory management system may dynamically allocate portions of the memory address space to programs being executed by the processors and may allocate a separate portion of the memory address space to data being used by such a program. Conversely, the memory management system may deallocate portions of the memory address space from programs when the programs are no longer being executed by the processors. The memory management system may include tables used to map virtual memory addresses that are used by the processors to the physical memory address space. These tables may include a main memory translation table (MMXT) and a translation lookaside buffer (TLB). Often the TLB contains memory mappings for memory addresses that are used more frequently than the memory addresses in the MMXT. Searching through the MMXT and/or the TLB for a memory mapping may be time consuming resulting in delayed data retrieval.

Memory systems are often arranged with a memory hierarchy. For example, certain memory may be found in registers, cache (e.g., level 1, level 2, level 3), main memory (e.g., RAM), disk storage, and so forth. As may be appreciated, some memory systems include memory types that have different operating characteristics (e.g., operate at differing speeds). However, memory management systems generally do not differentiate between types of memory in the memory system (e.g., main memory). Accordingly, such memory management systems may handle all types of memory in the same manner. Further, some memory devices in the memory systems may be accessed (e.g., read from and/or written to) a greater number of times than other memory devices in the memory systems. As such, it may be difficult for a memory management system to identify (e.g., determine) which memory devices operate at a particular speed within the memory system. Likewise, it may be difficult for a memory management system to identify which memory devices are accessed more than others.

Accordingly, embodiments of the present invention may be directed to one or more of the problems set forth above.

DETAILED DESCRIPTION

Some of the subsequently discussed embodiments may facilitate memory systems with greater versatility, such as memory systems that use multiple different types of memory devices and memory systems that dynamically rearrange data stored on the different types of memory devices. As is described in detail below, a memory management system may include a table that correlates a physical memory address with a type of memory device. For example, a memory management system may include a table having multiple virtual memory addresses. Each virtual memory address may correspond to a physical memory address and to data that identifies a type of corresponding memory device. The physical memory address may be used to access the memory device when a table hit occurs. As such, the following discussion describes devices and methods in accordance with embodiments of the present technique.

Figure 1:
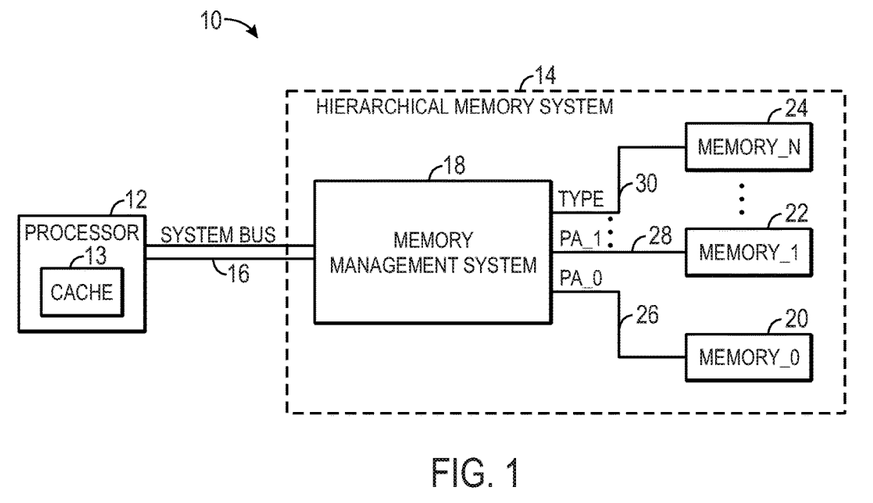
FIG. 1 illustrates a block diagram of a processor-based system in accordance with embodiments of the present invention.

Turning now to the drawings, and referring initially to FIG. 1, a block diagram depicting a processor-based system, generally designated by reference numeral 10, is illustrated. The system 10 may be any of a variety of types such as a computer, pager, cellular phone, personal organizer, control circuit, etc. In a typical processor-based device, one or more processors 12, such as a microprocessor, control the processing of system functions and requests in the system 10. As will be appreciated, the processor 12 may include an embedded North or South bridge (not shown), for coupling components thereto. Alternatively, the system 10 may include separate bridges coupled between the processor 12 and the various components of the system 10. As illustrated, the processor 12 may include cache 13 (e.g., CPU cache) to reduce the average time that it takes for the processor 12 to access memory.

Various devices may be coupled to the processor 12 depending on the functions that the system 10 performs. For instance, a user interface may be coupled to the processor 12. The user interface may include buttons, switches, a keyboard, a light pen, a mouse, a display, and/or a voice recognition system, for instance. The display may include a touchscreen display, an LCD display, a CRT, LEDs, and/or an audio display, for example. One or more communication ports may also be coupled to the processor 12. The communication port may be adapted to be coupled to one or more peripheral devices such as a modem, a printer, a computer, or to a network, such as a local area network, remote area network, intranet, or the Internet, for instance.

Because the processor 12 generally controls the functioning of the system 10 by implementing software programs, memory is operably coupled to the processor 12 to store and facilitate execution of various programs. Accordingly, a hierarchical memory system 14 is operably coupled to the processor 12 via a system bus 16. The hierarchical memory system 14 includes a memory management system 18 and any number of memory devices. For example, the hierarchical memory system 14 may include a memory_0 20 (e.g., of a first type), a memory_1 22 (e.g., of a second type), and any additional memory devices represented by memory_N 24 (e.g., of an nth type).

The memory management system 18 may perform a variety of memory management functions. For example, the memory management system 18 may manage virtual memory address to physical memory address translation, memory reallocation, memory organization, memory usage, and so forth. As illustrated, the memory management system 18 is operably coupled to the memory devices 20, 22, and 24 by respective data busses PA_0 26, PA_1 28, and PA_N 30. As will be appreciated, PA_N 30 may represent a number of data busses that correspond to the memory devices memory_N 24.

One or more of the memory devices 20, 22, and 24 may be volatile memory which may include Dynamic Random Access Memory (DRAM), and/or Static Random Access Memory (SRAM). The volatile memory may include a number of memory modules, such as single inline memory modules (SIMMs), dual inline memory modules (DIMMs), and/or Hybrid Memory Cubes (HMCs). As will be appreciated, the volatile memory may simply be referred to as the "system memory." The volatile memory is typically quite large so that it can store dynamically loaded applications and data.

Further, one or more of the memory devices 20, 22, and 24 may be non-volatile memory which may include read-only memory (ROM), such as an EPROM, flash memory (e.g., NOR and/or NAND), and/or phase-change memory (PCM) to be used in conjunction with the volatile memory. The size of the ROM is typically selected to be large enough to store any necessary operating system, application programs, and fixed data. Additionally, the non-volatile memory may include a high capacity memory such as a tape or disk drive memory. Accordingly, the memory devices 20, 22, and 24 do not need to be block storage devices.

Figure 2:
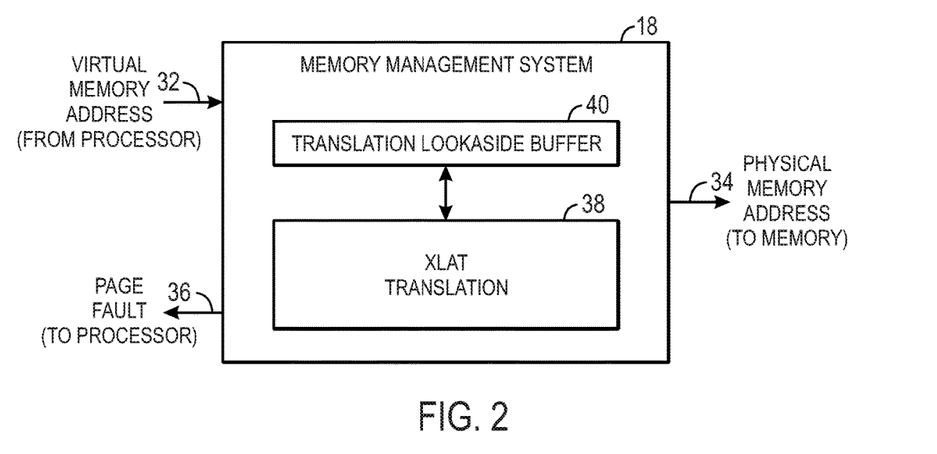
FIG. 2 illustrates a block diagram of a memory management system in accordance with embodiments of the present invention.
Figure 3:
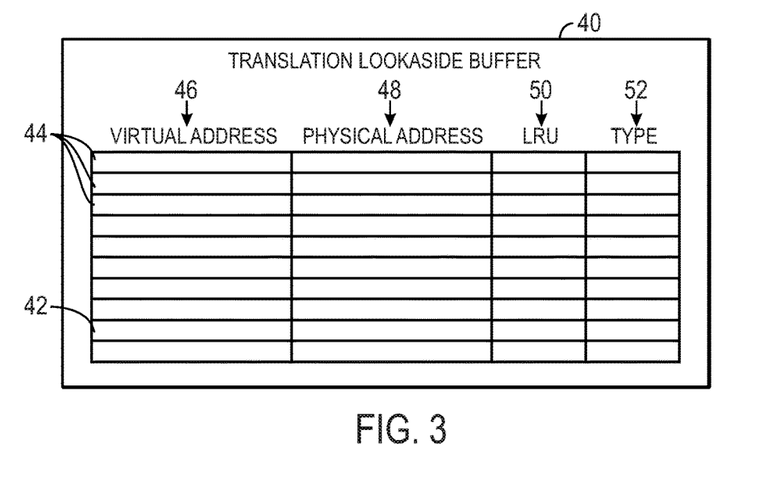
FIG. 3 illustrates a block diagram of a translation lookaside buffer in accordance with embodiments of the present invention.
Figure 4:
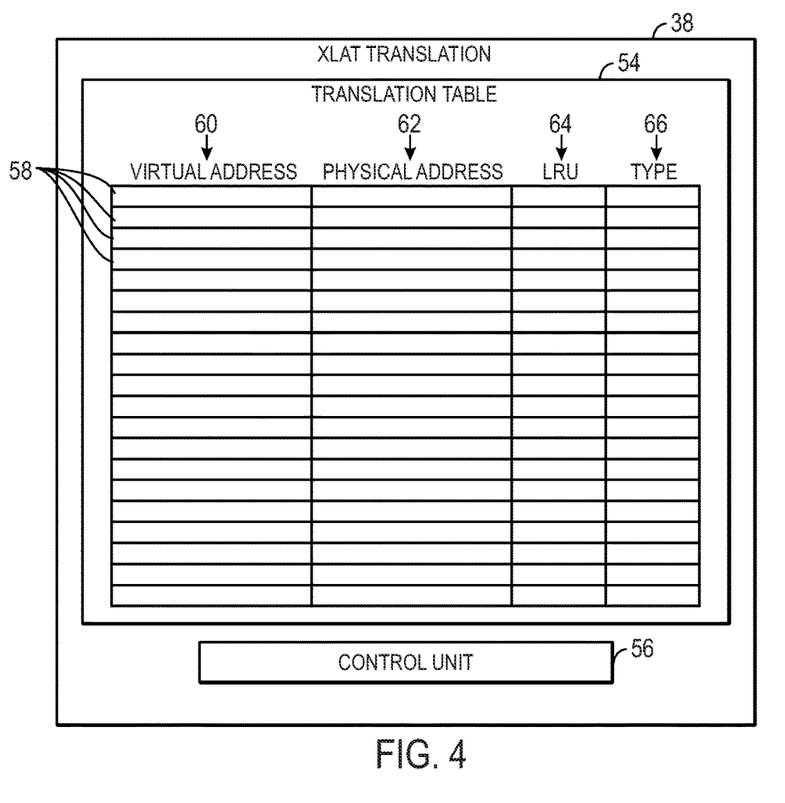
FIG. 4 illustrates a block diagram of a translation device in accordance with embodiments of the present invention.
Figure 5:
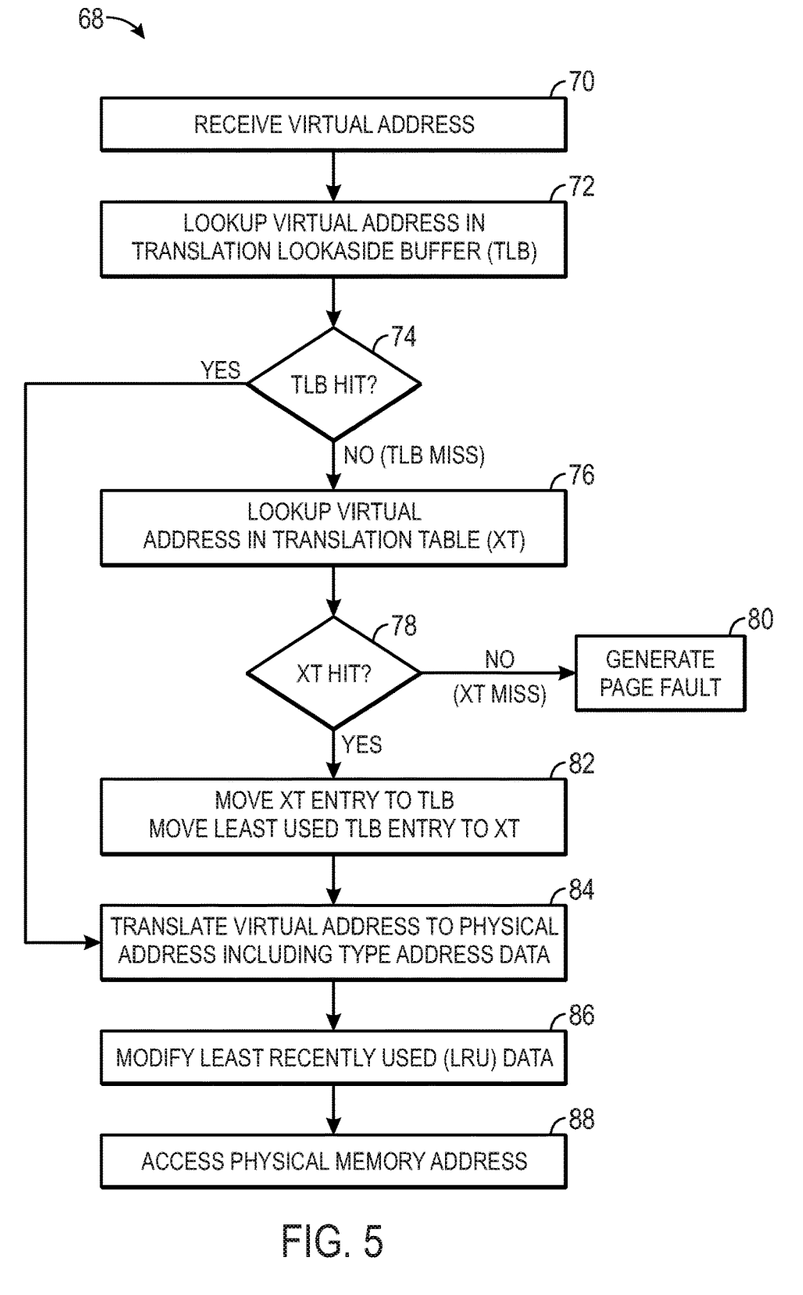
FIG. 5 illustrates a flow chart of a method for accessing a physical memory address when a memory management system receives a virtual memory address in accordance with embodiments of the present invention.
Figure 6:
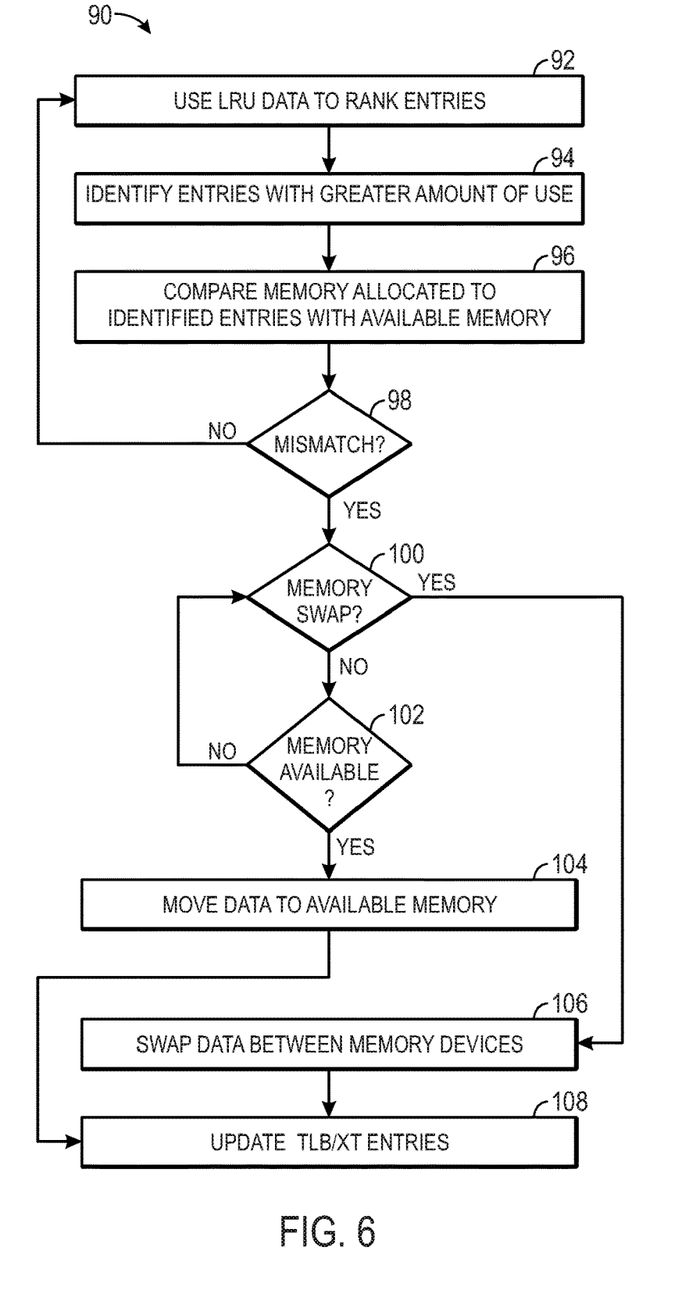
FIG. 6 illustrates a flow chart of a method for managing physical memory address space of a computing system in accordance with embodiments of the present invention.

As such, the hierarchical memory system 14 is versatile in allowing many types of memory devices 20, 22, and 24 to be operably coupled to the processor 12. Accordingly, the memory management system 14 may be adapted to the hierarchical memory system 14 to optimize the performance of the memory devices 20, 22, and 24. Some examples of the memory management system 18 adapted for use in the hierarchical memory system 14 are illustrated in FIGS. 2-4. Specifically, FIG. 2 illustrates a memory management system 18 with a translate (XLAT) translation device and a translation lookaside buffer and FIGS. 3 and 4 further illustrate the translation lookaside buffer and the XLAT translation device, respectively. FIGS. 5 and 6 illustrate methods that the memory management system 18 may use to manage the memory devices 20, 22, and 24.

Referring now to FIG. 2, a block diagram of the memory management system 18 is illustrated. During operation, the memory management system 18 receives a virtual memory address 32 (e.g., from processor 12). The memory management system 18 identifies a physical memory address 34 that is mapped to the virtual memory address 32 and that is used to access one of the memory devices 20, 22, and 24. If the memory management system 18 is unable to identify which physical memory address 34 is mapped to the virtual memory address 32, then the memory management system 18 produces (e.g., generates) a page fault 36, which may be transmitted to the processor 12.

To identify the physical memory address 34 that is mapped to the virtual memory address 32, the memory management system 18 uses an XLAT translation device 38 and a translation lookaside buffer (TLB) 40. The XLAT translation device 38 and the TLB 40 may each store a respective table that maps virtual memory addresses to physical memory addresses. Although the XLAT translation device 38 and the TLB 40 are illustrated separately, in certain embodiments, the XLAT translation device 38 and the TLB 40 may be incorporated within a single device. As will be appreciated, the XLAT translation device 38 and the TLB 40 may contain non-overlapping data. For example, the XLAT translation device 38 may contain table entries for a first portion of the virtual memory addresses, while the TLB 40 contains table entries for a second portion of the virtual memory addresses.

Typically, the TLB 40 contains table entries for virtual memory addresses that are accessed more frequently than the virtual memory addresses stored in the XLAT translation device 38. In certain embodiments, a search for the virtual memory address 32 may occur concurrently in the XLAT translation device 38 and the TLB 40. In other embodiments, a search for the virtual memory address 32 may occur in the TLB 40 before the search occurs in the XLAT translation device 38. However, after a table entry including the virtual memory address 32 is identified (e.g., located), both the XLAT translation device 38 and the TLB 40 stop searching for the virtual memory address 32.

In the present embodiment, the XLAT translation device 38 and the TLB 40 may each store data relating to how frequently a particular virtual memory address and/or physical memory address are accessed. Further, the XLAT translation device 38 and the TLB 40 may each store data that identifies a type of memory device corresponding to the physical memory address. Using this additional data, the memory management system 18 may optimize memory usage and/or optimize table mapping data stored in the XLAT translation device 38 and the TLB 40, as explained in detail below.

Accordingly, FIG. 3 illustrates a block diagram of the TLB 40 that may store data relating to how frequently a particular virtual memory address and/or physical memory address are accessed, and may store data that identifies a type of memory device corresponding to the particular physical memory address. In certain embodiments, the TLB 40 may be a content-addressable memory (CAM) device or n-way associative memory device. Specifically, the TLB 40 stores a table 42 having rows 44 and columns (46-52). In the present embodiment, each row 44 relates to a separate table entry. As such, each row 44 includes a virtual memory address column 46, a physical memory address column 48, a least recently used (LRU) column 50, and a device identification (TYPE) column 52.

The virtual memory address column 46 includes a listing of all virtual memory addresses contained in the TLB 40. Further, the physical memory address column 48 includes a physical memory address in each row 42 that corresponds to the virtual memory address in the virtual memory address column 46 of the respective row 42. The LRU column 50 includes data that relates to how frequently a respective physical memory address is accessed (e.g., access or usage data). For example, the LRU column 50 may include a value that represents the total number of times its corresponding virtual memory address and/or physical memory address have been accessed. As such, the LRU column 50 may be used to identify whether table entries should be removed from the table 42. For example, rows 44 that have been accessed with the least frequency (e.g., have the lowest value stored in the LRU column 50), may be removed from the table 42.

The TYPE column 52 includes device identification data in each row 42 that identifies a type of device that corresponds to the physical memory address in the physical memory address column 48 of the respective row 42. The device is accessed using the physical memory address (e.g., when a table hit occurs). For example, the device identification data may be a value that corresponds to a type of device. As will be appreciated, the memory management system 18 may include data that corresponds to each device. For example, the memory management system 18 may include data such as a name of each device, an operating speed of each device, a bus assigned to each device, an indication of relative speed of each device in relation to other physical devices, an endurance of each device, and so forth. During operation, the physical address may be used to directly access the memory devices 20, 22, and 24, thereby quickly accessing data stored on the memory devices 20, 22, and 24.

Turning to FIG. 4, a block diagram of the XLAT translation device 38 is illustrated. The XLAT translation device 38 includes a translation table (XT) 54 that may store data relating to how frequently a particular virtual memory address and/or physical memory address are accessed, and may store data that identifies a type of the memory device that corresponds with each physical memory address. Further, the XLAT translation device 38 includes a control unit 56 (e.g., a logic die of a hybrid memory cube) for controlling various operations of the XLAT translation device 38. Specifically, the XT 54 stores a table having rows 58 and columns (60-66). In the present embodiment, each row 58 relates to a separate table entry. As such, each row 58 includes a virtual memory address column 60, a physical memory address column 62, an LRU column 64, and a TYPE column 66.

The virtual memory address column 60 includes a listing of all virtual memory addresses contained in the XT 54. Further, the physical memory address column 62 includes a physical memory address in each row 58 that corresponds to the virtual memory address in the virtual memory address column 60 of the respective row 58. The LRU column 64 includes data that relates to how frequently a respective physical memory address is accessed (e.g., access or usage data). For example, the LRU column 64 may include a value that represents the total number of times its respective virtual memory address and/or physical memory address have been accessed. As such, the LRU column 64 may be used (e.g., by the control unit 56 of the translation device 38) to identify whether table entries should be moved from the XT 54 to the TLB 40. For example, rows 58 that have been accessed with the highest frequency (e.g., have the highest value stored in the LRU column 64), may be moved from the XT 54 into the TLB 40, at least in some conditions.

The TYPE column 66 includes device identification data in each row 58 that identifies a type of device that corresponds to the physical memory address in the physical memory address column 62 of the respective row 58. The device is accessed using the physical memory address (e.g., when a table hit occurs). For example, the device identification data may be a value that corresponds to a type of device. During operation, the physical memory address may be used to directly access the memory devices 20, 22, and 24, thereby quickly accessing data stored on the memory devices 20, 22, and 24.

The XLAT translation device 38 may be any of a variety of different devices, such as a hybrid memory cube (HMC) or a pattern recognition device, such as that disclosed in U.S. Publication Number 2010/0138575. Furthermore, hardware (e.g., processor) and/or software may be used to execute a search of the XT 54. As will be appreciated, prolonged access to the XT 54 may result in a significant performance penalty, particularly if stored in main memory (e.g., where the translation device 38 itself serves as the main memory, as may be the case if embodied in an HMC device). Accordingly, certain translation devices 38 may include hardware and/or software logic in addition to memory cells. For example, the XT 54 may be stored on a high performance memory array (HPMA) (e.g., HMC) or an assistive search memory device, such as the previously mentioned pattern recognition device. Such devices may be configured to search for virtual memory addresses within the XT 54 (e.g., execute a table walk). It should be noted that the TLB 40 may also be stored on an HPMA or an assistive search memory device. In certain embodiments, the TLB 40 and the XT 54 may be stored on the same device. By using an HPMA or an assistive search memory device, improved performance may be achieved. In certain embodiments, the control unit 56 may be used to perform a variety of functions. For example, the control unit 56 may control page table walks, TLB updates, LRU calculations, LRU updates, direct memory access for page movements, dynamically rearranging data that is assigned to the devices, dynamically change the mapping of virtual memory addresses to physical memory addresses, and so forth.

The control unit 56 may include software and/or hardware to aid functions of the memory management system 18. As such, FIG. 5 illustrates a flow chart of a method 68 for accessing a physical memory address when the memory management system 18 receives a virtual memory address. At block 70, the memory management system 18 receives a virtual memory address. Then, at block 72, the memory management system 18 searches for the virtual memory address in the TLB 40 (e.g., performs a lookup). Next, at block 74, a determination is made as to whether the memory management system 18 has identified (e.g., found) the virtual memory address in the TLB 40. If there is a TLB "miss," at block 76, the memory management system 18 searches for the virtual memory address in the XT 54 (e.g., executes a lookup or a table walk). Then, at block 78, a determination is made as to whether the memory management system 18 has identified the virtual memory address in the XT 54. If there is an XT "miss," at block 80, the memory management system 18 generates a page fault 36 which is sent to the processor 12.

If there is an XT "hit," then, at block 82, the memory management system moves the XT table entry to the TLB 40. Further, at block 82, the memory management system 18 moves the least used TLB 40 entry to the XT 54. Next, at block 84, the memory management system 18 translates the virtual memory address to a physical memory address. This occurs after block 82, or in response to a TLB "hit" occurring per block 74. As will be appreciated, translating the virtual memory address to the physical memory address may include accessing all of the data in the entry that relates to the virtual memory address. For example, the memory management system 18 may retrieve the TYPE column data from the table entry for accessing the memory device. At block 86, the LRU data for the accessed table entry is updated (e.g., modified). For example, the value stored in the LRU column may be increased by one. Next, at block 88, the physical memory address is accessed.

Turning now to FIG. 6, a flow chart 90 of a method for managing a memory address space of a computing system is illustrated. At block 92, the memory management system 18 may use LRU data to rank table entries, such as ranking a table entry based on a number of times that a virtual memory address and/or a physical memory address of the table entry is accessed. Next, at block 94, the memory management system 18 may identify table entries that have a greater amount of use than other table entries and/or the memory management system 18 may identify table entries that have a lower amount of use than other table entries. Then, at block 96, the memory management system 18 may compare the type of memory devices that are allocated to the identified entries to available types of memory devices. For example, the memory management system 18 may identify whether table entries with a greater amount of use (e.g., higher access rates) are allocated to better memory types (e.g., faster memory, improved endurance) than table entries with a lower amount of use. At block 98, the memory management system 18 may identify whether there is a mismatch between a number of times the physical memory address is accessed and a type of memory device corresponding to the physical memory address.

If there is not a mismatch, the method may return to block 92. However, if there is a mismatch between the number of times the physical memory address is accessed and the type of memory device corresponding to the physical memory address, the memory management system 18 may identify whether a memory swap can be performed, per block 100. In certain embodiments, a memory swap may include exchanging a first set of data stored in a first type of memory with a second set of data stored in a second type of memory. For example, the memory management system 18 may move a first set of data stored in a first type of memory to a second type of memory and move a second set of data stored in the second type of memory to the first type of memory. Furthermore, moving the first and second sets of data may happen concurrently. For example, certain types of memory may support data movement that occurs simultaneously in both directions, such as DRAM DIMMs and HMC, and DRAM DIMMs and PCM. If a memory swap cannot be performed, the memory management system 18 may identify whether there is any memory available for moving the mismatched data, per block 102. If there is not any memory available, the method may return to block 100.

If there is memory available, per block 104, the memory management system 18 may move data from the memory of the identified entries to the available memory. For example, the memory management system 18 may cause data that corresponds to the identified table entries to be moved to a different type of memory device to remove the mismatch between the number of times the physical memory address is accessed and the type of memory corresponding to the physical memory address. Returning to block 100, if the memory management system 18 is able to perform a memory swap, the memory management system 18 may swap data between the memory devices, per block 106. After block 104 or block 106, the memory management system 18 updates the TLB 40 and/or XT 54 table entries. For example, the memory management system 18 may update the TLB 40 and/or XT 54 table entries with a revised mapping between a virtual memory address and a physical memory address, revised device data, and/or updated LRU data.

While the blocks 92 thorough 108 are described as being performed by the memory management system 18, it should be noted that any portion of the memory management system 18 (e.g., hardware and/or software) may perform the items described. For example, any of blocks 92 thorough 108 may be performed by the control unit 56. In certain embodiments, the memory management system 18 and/or the control unit 56 may be configured to dynamically change the mapping of virtual memory addresses to physical memory addresses based on an endurance or speed of a memory type. Using the techniques described herein, the memory management system 18 may maximize the performance of the system 10 and/or minimize software overhead.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for managing a memory address space of a computer system comprising:
   identifying whether a table entry has a mismatch between a number of times a physical memory address of the table entry is accessed and a type of memory device corresponding to the physical memory address;
   if the table entry has a mismatch, moving data that corresponds to the table entry to a different type of memory device; and
   updating the table entry to include a revised virtual memory address to physical memory address mapping.

2. The method of claim 1, wherein moving data that corresponds to the table entry comprises moving a first set of data stored in a first type of memory to a second type of memory.

3. The method of claim 2, wherein moving data that corresponds to the table entry comprises moving a second set of data stored in the second type of memory to the first type of memory.

4. The method of claim 3, wherein moving data that corresponds to the table entry comprises moving the first set of data and the second set of data concurrently.

5. The method of claim 1, wherein identifying whether the table entry has a mismatch comprises identifying whether the table entry of a table has a mismatch, wherein the table comprises a first plurality of virtual memory addresses, and wherein each virtual memory address corresponds to a physical memory address and to data that identifies a type of memory device corresponding to the physical memory address.

6. The method of claim 1, comprising ranking the table entry based on a number of times a physical memory address is accessed.

7. A memory management system comprising a translation device having a control unit configured to dynamically change the mapping of virtual memory addresses to physical memory addresses based on a memory type that corresponds to the physical memory addresses;
wherein the control unit is configured to move data stored on a first memory type having a first speed to a second memory type having a second speed after the data is accessed a number of times greater than a predetermined threshold, wherein the second speed is faster than the first speed.

8. The memory management system of claim 7, wherein the control unit is configured to move a first set of data stored in a first memory device of the first memory type to a second memory device of the second memory type.

9. The memory management system of claim 8, wherein the control unit is configured to move a second set of data stored in the second memory device of the second memory type to the first memory device of the first type.

10. The memory management system of claim 9, wherein the control unit is configured to move the first set of data and the second set of data concurrently.

11. The memory management system of claim 7, wherein the control unit is configured to dynamically change the mapping of virtual memory addresses to physical memory addresses based on an endurance of the memory type.

12. The memory management system of claim 7, wherein the control unit is configured to dynamically change the mapping of virtual memory addresses to physical memory addresses based on a speed of the memory type.

13. The memory management system of claim 7, wherein:
the translation device comprises a translation table, wherein the translation table comprises a first table entry corresponding with a first virtual memory address; and
the control unit is configured to dynamically change the mapping of the virtual memory addresses to the physical memory addresses by updating the first table entry from associating the first virtual memory address with a first physical memory address to associating the first virtual memory address with a second physical memory address based at least in part on the first memory type of the first physical memory address, the second memory type of the second physical memory address, or both.

14. The memory management system of claim 13, wherein the control unit is configured to move first data stored at the first physical memory address of the first memory type to the second physical memory address of the second memory type when the first table entry is updated from associating the first virtual memory address with the first physical memory address to associating the first virtual memory address with the second physical memory address.

15. The memory management system of claim 14, wherein:
the translation table comprises a second table entry corresponding with a second virtual memory address; and
the control unit is configured to:
dynamically change the mapping of the virtual memory addresses to the physical memory addresses by updating the second table entry from associating the second virtual memory address with a physical memory address of the second memory type to a different memory address of the first memory type when the first table entry is updated from associating the first virtual memory address with the first physical memory address of the first memory type to associating the first virtual memory address with the second physical memory address of the second memory type; and
move second data stored at the physical memory address of the second memory type to the different physical memory address of the first memory type when the second table entry is updated from associating the second virtual memory address with the physical memory address of the second memory type to associating the second virtual memory address with the different memory address of the first memory type.

16. A non-transitory tangible machine-readable medium having code stored there, the code comprising instructions for:
identifying whether a table entry has a mismatch between a number of times a physical memory address of the table entry is accessed and a type of memory device corresponding to the physical memory address;
if the table entry has a mismatch, moving data that corresponds to the table entry to a different type of memory device; and
updating the table entry to include a revised virtual memory address to physical memory address mapping.

17. The non-transitory tangible machine-readable medium of claim 16, comprising instructions for moving a first set of data stored in a first type of memory device to a second type of memory device.

18. The non-transitory tangible machine-readable medium of claim 16, comprising instructions for moving a first set of data stored in a first type of memory device to a second type of memory device and instructions for moving a second set of data stored in the second type of memory device to the first type of memory device.

19. The non-transitory tangible machine-readable medium of claim 16, wherein the instructions for identifying whether the table entry has a mismatch comprise instructions for identifying whether the table entry of a table has a mismatch, wherein the table comprises a first plurality of virtual memory addresses, and wherein each virtual memory address corresponds to a physical memory address and to data that identifies a type of memory device corresponding to the physical memory address.

20. The non-transitory tangible machine-readable medium of claim 16, comprising instructions for ranking the table entry based on a number of times a physical memory address is accessed.

21. A method for managing a memory address space of a computer system comprising:
ranking a table entry based on a number of times a physical memory address is accessed;
identifying whether the table entry is accessed greater than a predetermined threshold; and
comparing memory allocated via the table entry to available memory to determine whether to change a type of memory device corresponding to the table entry.

22. The method of claim 21, wherein identifying whether the table entry is accessed greater than the predetermined threshold comprises identifying whether the table entry of a table has been accessed greater than the predetermined threshold, wherein the table comprises a first plurality of virtual memory addresses, and wherein each virtual memory address corresponds to a physical memory address and to data that identifies a type of memory device corresponding to the physical memory address.

* * * * *